(12) United States Patent
Tucker et al.

(10) Patent No.: US 9,844,826 B2
(45) Date of Patent: Dec. 19, 2017

(54) METHODS FOR MANUFACTURING A TURBINE NOZZLE WITH SINGLE CRYSTAL ALLOY NOZZLE SEGMENTS

(71) Applicant: HONEYWELL INTERNATIONAL INC., Morristown, NJ (US)

(72) Inventors: Bradley Reed Tucker, Chandler, AZ (US); Ardeshir Riahi, Scottsdale, AZ (US); Jason Smoke, Phoenix, AZ (US); Ed Zurmehly, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 541 days.

(21) Appl. No.: 14/341,162

(22) Filed: Jul. 25, 2014

(65) Prior Publication Data
US 2016/0024948 A1    Jan. 28, 2016

(51) Int. Cl.
| | | |
|---|---|---|
| *F01D 9/04* | (2006.01) | |
| *B23K 1/00* | (2006.01) | |
| *B22D 19/00* | (2006.01) | |
| *B22D 19/04* | (2006.01) | |
| *B23P 15/00* | (2006.01) | |

(52) U.S. Cl.
CPC ........ *B23K 1/0018* (2013.01); *B22D 19/0081* (2013.01); *B22D 19/04* (2013.01); *B23P 15/006* (2013.01); *F01D 9/044* (2013.01); *F05D 2230/21* (2013.01); *F05D 2230/237* (2013.01); *F05D 2230/90* (2013.01); *F05D 2300/607* (2013.01); *Y10T 29/49346* (2015.01)

(58) Field of Classification Search
CPC . Y10T 29/49343; B23K 1/0018; F01D 9/044; B23P 15/006; B22D 19/0081; B22D 19/04; F05D 2230/21; F05D 2230/90; F05D 2230/237; F05D 2300/607

See application file for complete search history.

(56) References Cited

U.S. PATENT DOCUMENTS

| | | | |
|---|---|---|---|
| 2,801,075 | A | 7/1957 | Broffitt |
| 2,915,280 | A | 12/1959 | Sander |
| 4,470,754 | A | 9/1984 | Manente, Jr. et al. |
| 4,623,298 | A | 11/1986 | Hallinger et al. |

(Continued)

FOREIGN PATENT DOCUMENTS

| | | | |
|---|---|---|---|
| EP | 1419849 A1 | 5/2004 | |
| EP | 1510654 A1 | 3/2005 | |

(Continued)

OTHER PUBLICATIONS

EP Examination Report for Application No. 15176713.4-1709 dated Jun. 2, 2017.

(Continued)

*Primary Examiner* — Sarang Afzali
*Assistant Examiner* — Ruth G Hidalgo-Hernandez
(74) *Attorney, Agent, or Firm* — Lorenz & Kopf, LLP

(57) ABSTRACT

Methods for manufacturing a turbine nozzle are provided. A plurality of nozzle segments is formed. Each nozzle segment comprises an endwall ring portion with at least one vane. The plurality of nozzle segments are connected to an annular endwall forming a segmented annular endwall concentric to the annular endwall with the at least one vane of each nozzle segment extending between the segmented annular endwall and the annular endwall.

13 Claims, 6 Drawing Sheets

(56) References Cited

U.S. PATENT DOCUMENTS

| | | | |
|---|---|---|---|
| 4,728,258 | A | 3/1988 | Blazek et al. |
| 5,290,143 | A | 3/1994 | Kington et al. |
| 5,482,433 | A | 1/1996 | Norris et al. |
| 5,630,700 | A | 5/1997 | Olsen et al. |
| 5,655,876 | A | 8/1997 | Rock et al. |
| 5,820,338 | A | 10/1998 | Kasprow et al. |
| 5,997,247 | A | 12/1999 | Arraitz et al. |
| 6,969,240 | B2 | 11/2005 | Strangman |
| 7,887,286 | B2 | 2/2011 | Abgrall et al. |
| 8,047,771 | B2 | 11/2011 | Tucker et al. |
| 8,197,184 | B2 * | 6/2012 | Chon .................. F01D 5/185 415/115 |
| 8,276,649 | B2 | 10/2012 | Gagnon, Jr. et al. |
| 2006/0239825 | A1 * | 10/2006 | Rice .................. B22D 19/04 416/241 R |
| 2007/0107218 | A1 | 5/2007 | Poccia et al. |
| 2007/0297900 | A1 | 12/2007 | Abgrall et al. |
| 2009/0068016 | A1 | 3/2009 | Perron et al. |
| 2009/0169369 | A1 * | 7/2009 | Morgan .................. F01D 9/023 415/174.2 |
| 2011/0033285 | A1 | 2/2011 | Turi et al. |
| 2012/0087788 | A1 | 4/2012 | Anderson et al. |
| 2012/0128465 | A1 | 5/2012 | Burdgick et al. |

FOREIGN PATENT DOCUMENTS

| | | | |
|---|---|---|---|
| EP | 1870562 | A2 | 12/2007 |
| EP | 2586993 | A2 * | 5/2013 ............ F01D 11/005 |
| EP | 2604812 | A1 | 6/2013 |

OTHER PUBLICATIONS

Bell et al.; Single Crystal Turbine Blades, Mar. 3, 2012.

Extended European Search report for Application No. 15176713.4-1709 dated Nov. 1, 2016.

* cited by examiner

METHODS FOR MANUFACTURING A TURBINE NOZZLE WITH SINGLE CRYSTAL ALLOY NOZZLE SEGMENTS

TECHNICAL FIELD

The present invention generally relates to gas turbine engines, and more particularly relates to methods for manufacturing a turbine nozzle with single crystal alloy nozzle segments.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary vanes. The combustion gas flow deflects off of the vanes and impinges upon turbine blades of a turbine rotor. A rotatable turbine disk or wheel, from which the turbine blades extend, spins at high speeds to produce power. Gas turbine engines used in aircraft use the power to draw more air into the engine and to pass high velocity combustion gas out of the gas turbine aft end to produce a forward thrust. Other gas turbine engines may use the power to turn a propeller or an electrical generator.

Typically, the stationary vanes of the turbine nozzle extend between an inner endwall ring (also known as a "hub ring") and an outer endwall ring (also known as a "shroud ring"). The inner and outer endwall rings define a portion of the flowpath along which the combustion gas travels. In some cases, the inner and/or outer endwalls rings are initially formed as segments, and the segments are subsequently assembled together to form a full ring (a "conventional segmented turbine nozzle"). Conventional segmented turbine nozzles may experience significant leakage where the adjacent segments meet at segment platform seal gaps and intermittent flange surfaces. Additionally, high leakage may exist where the segments mate to the supporting structure due to dimensional variation caused by individually machined segments. The leakage between segments is detrimental to the gas turbine engine in two major ways. First, the leakage increases chargeable cooling flow that does not get turned by the turbine nozzle to produce work across the turbine rotor, thus increasing fuel consumption. Secondly, the increased leakage flow wastes precious cooling flow that could be used for combustor and turbine component cooling. As combustor and turbine nozzle distress are among the top contributors to hot section replacement overhaul costs, gas turbine engine designers are eagerly seeking ways to reduce this detrimental leakage in segmented turbine nozzles and use the flow to cool the combustor and nozzle instead, thereby improving component durability and service life.

Turbine nozzles may also be manufactured by bi-casting the stationary turbine vanes with the inner and outer endwall rings, so that the rings and the vanes comprise a single, unitary turbine nozzle (a "conventional bi-cast turbine nozzle"). Though bi-cast inner and outer endwall rings reduce turbine nozzle leakage, they may be difficult and/or time consuming to manufacture, with reduced manufacturing yields. For example, a bi-cast turbine nozzle may suffer cracking distress and reduced service life due to thermo-mechanical fatigue (TMF) caused by a lack of radial compliance between the vanes and endwall rings. In addition, bi-casting of the endwall rings requires that the endwall rings be fabricated from an equi-axed alloy that has lower strength and oxidation capabilities than a single crystal alloy. Moreover, protective coatings may be relatively difficult to apply to conventional bi-cast turbine nozzles. The coated surfaces of conventional bi-cast turbine nozzles show irregularities on the surfaces where "shadows" cast by adjacent vanes result in a non-optimal coating microstructure and thickness distribution.

Hence, there is a need for improved methods for manufacturing a turbine nozzle with single crystal alloy nozzle segments. There is also a need for improved methods for manufacturing a turbine nozzle with single crystal alloy nozzle segments to reduce leakage and improve coating application. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods are provided for manufacturing a turbine nozzle. In accordance with one exemplary embodiment, the method comprises forming a plurality of nozzle segments. Each nozzle segment comprises an endwall ring portion with at least one vane extending therefrom. The plurality of nozzle segments are connected to an annular endwall forming a segmented annular endwall concentric to the annular endwall with the at least one vane of each nozzle segment extending between the segmented annular endwall and the annular endwall.

Methods are provided for manufacturing a turbine nozzle, in accordance with yet another exemplary embodiment of the present invention. The method comprises forming a plurality of nozzle segments configured to be connected to an annular endwall. Each nozzle segment is integrally cast as one piece from a single crystal alloy material and is comprised of an endwall ring portion and at least one vane having a free end portion. The annular endwall is bi-cast around the plurality of nozzle segments. The endwall ring portion of each nozzle segment cooperates with a circumferentially adjacent nozzle segment to form a segmented annular endwall. The at least one vane of each nozzle segment extends between the segmented annular endwall and the annular endwall.

Methods are provided for manufacturing a turbine nozzle, in accordance with yet another exemplary embodiment of the present invention. The method comprises forming a plurality of nozzle segments configured to be connected to an annular endwall. Each nozzle segment is integrally cast as one piece from a single crystal alloy material and is comprised of an endwall ring portion and at least one vane. The at least one vane of each nozzle segment is brazed to the annular endwall. The endwall ring portion of each nozzle segment cooperates with the endwall ring portion of a circumferentially adjacent nozzle segment to form a segmented annular endwall. The segmented annular endwall is concentric to the annular endwall with the at least one vane of each nozzle segment extending between the segmented annular endwall and the annular endwall.

Furthermore, other desirable features and characteristics of the methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to methods for manufacturing a turbine nozzle with single crystal alloy nozzle segments. Such manufacturing methods enable using a single crystal alloy material, thereby conferring increased strength and/or oxidation life to the turbine nozzle manufactured according to exemplary embodiments as described herein. In addition, such methods also improve manufacturing yields and protective coating characteristics of the turbine nozzle, as the nozzle segments may be coated prior to assembly as hereinafter described, providing an improved protective coating microstructure and thickness distribution. Such methods also enable the manufacture of a turbine nozzle with radial compliance without the use of a slip joint and reduced leakage flows relative to conventional segmented turbine nozzles.

Figure 1:
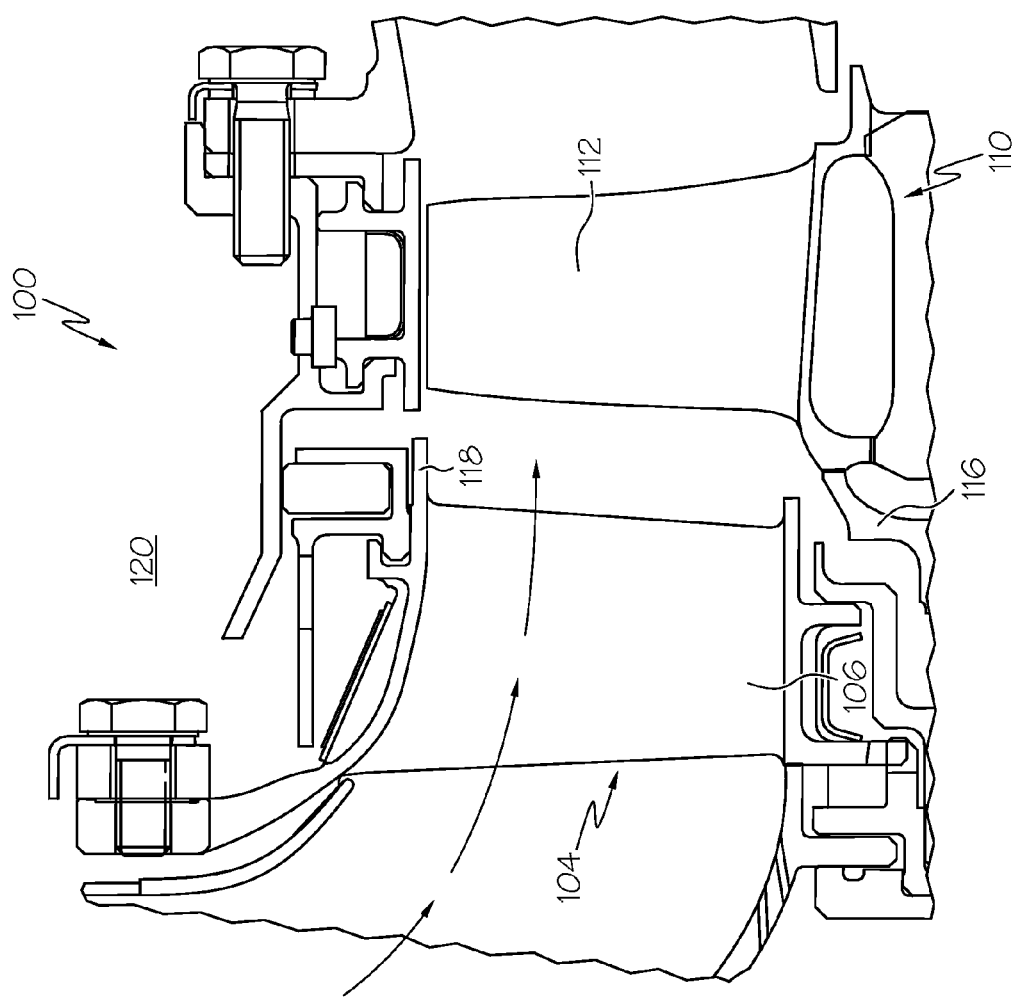
FIG. 1 is a cross-sectional side view of a turbine section of an exemplary gas turbine engine.

FIG. 1 is a cross-sectional side view of a portion of a turbine section 100 of a gas turbine engine. The turbine section 100 receives high temperature (e.g., a temperature typically in the range of about 1100 to 1800° C.) gases from an upstream engine combustor (not shown) to produce energy for the engine and/or components coupled to the engine. The turbine section 100 includes a turbine nozzle 104 that has a plurality of static vanes 106 (only one of which is shown) that direct the gases from the combustor to a turbine rotor 110. According to an embodiment, the turbine rotor 110 includes a plurality of blades 112 (only one of which is shown) that are retained in axial position by a retention plate 116. When the blades 112 are impinged upon by the gases, the gases cause the turbine rotor 110 to spin. According to an embodiment, an outer circumferential wall 118 (also referred to hereinafter as "an outer endwall ring" 206) surrounds the static vanes 106 and defines a portion of a plenum 120. The plenum 120 receives air from a compressor section (not shown), which may be directed through one or more openings in the outer circumferential wall 118 to cool the static vanes 106.

Figure 2:
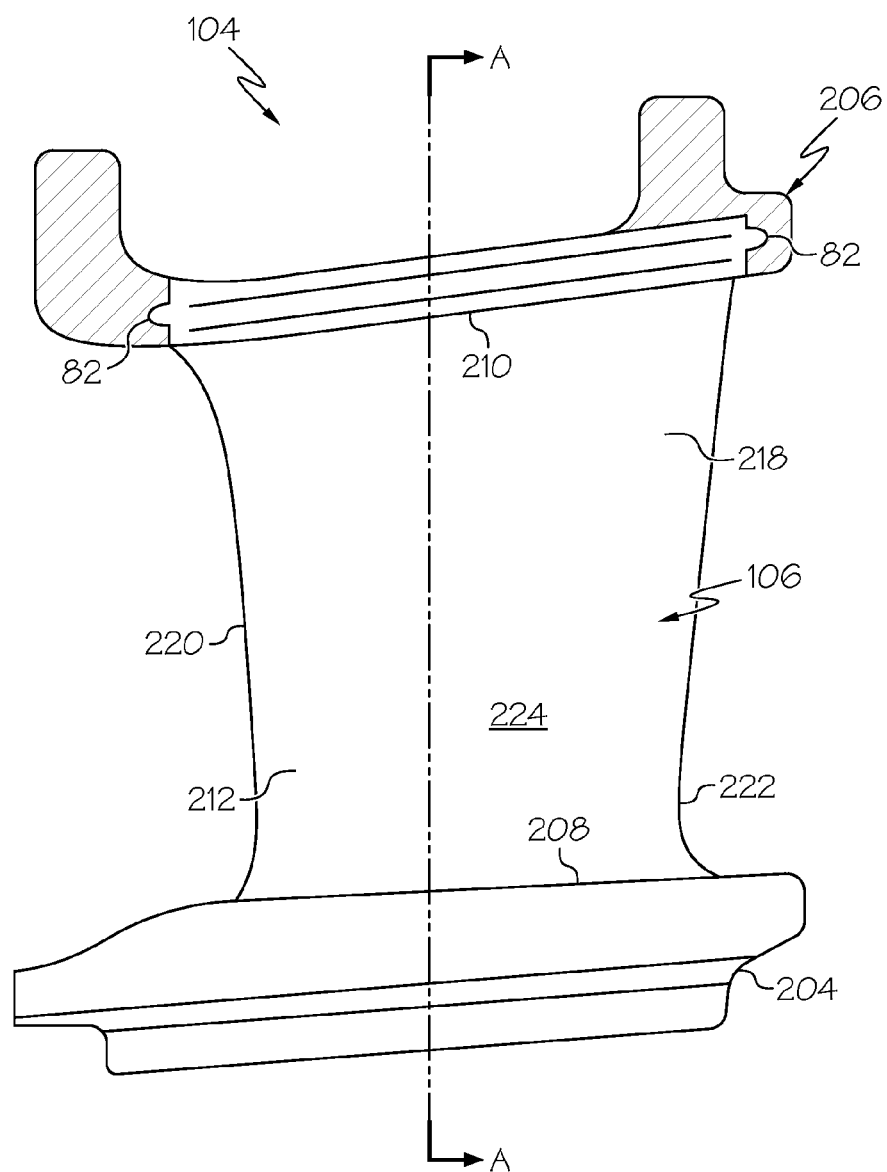
FIG. 2 is a simplified side view of a portion of a turbine nozzle manufactured according to exemplary embodiments, the turbine nozzle comprising an outer endwall ring disposed concentrically to and radially outwardly from an inner endwall ring and a plurality of stationary vanes extending between the inner and outer endwall rings.

FIG. 2 is a side view of a portion of the turbine nozzle 104 manufactured according to exemplary embodiments of the present invention. The turbine nozzle 104 includes the plurality of static or stationary vanes (only one of which is shown) 106, an inner endwall ring 204, and an outer endwall ring 206. The vanes 106 extend between the rings 204, 206 and, as hereinafter described, may form a joint with the outer endwall ring 206 (e.g., such as by bi-casting as depicted in FIG. 2 or by braze joint A as depicted in FIG. 8). The inner endwall ring 204 is disposed concentric to and radially inwardly from the outer endwall ring 206. As hereinafter described, one of the inner endwall ring or the outer endwall ring comprises an "annular endwall" and the other of the inner endwall ring or the outer endwall ring comprises a "segmented annular endwall" in the turbine nozzle. In the depicted embodiments of FIGS. 6 through 8, the inner endwall ring comprises the segmented annular endwall and the outer endwall ring comprises the annular endwall. In an alternative embodiment (not shown), the outer endwall ring comprises the segmented annular endwall and the inner endwall ring comprises the annular endwall, in which case the vanes form a joint with the inner endwall ring.

Each vane 106 includes an airfoil 212, an inner end 208, and an outer end 210. The airfoil has two outer walls 218 (only one of which is shown), each having outer surfaces that define an airfoil shape. The airfoil shape includes a leading edge 220, a trailing edge 222, a pressure side 224 along the first outer wall 218, and a suction side along the second outer wall (not shown). In some embodiments, though not shown, the vane 106 may have an internal cooling circuit formed therein, that may extend from an opening in the first end through the vane and may include various passages that eventually communicate with trailing edge openings or other openings (not shown) that may be formed in the vane.

Figure 3:
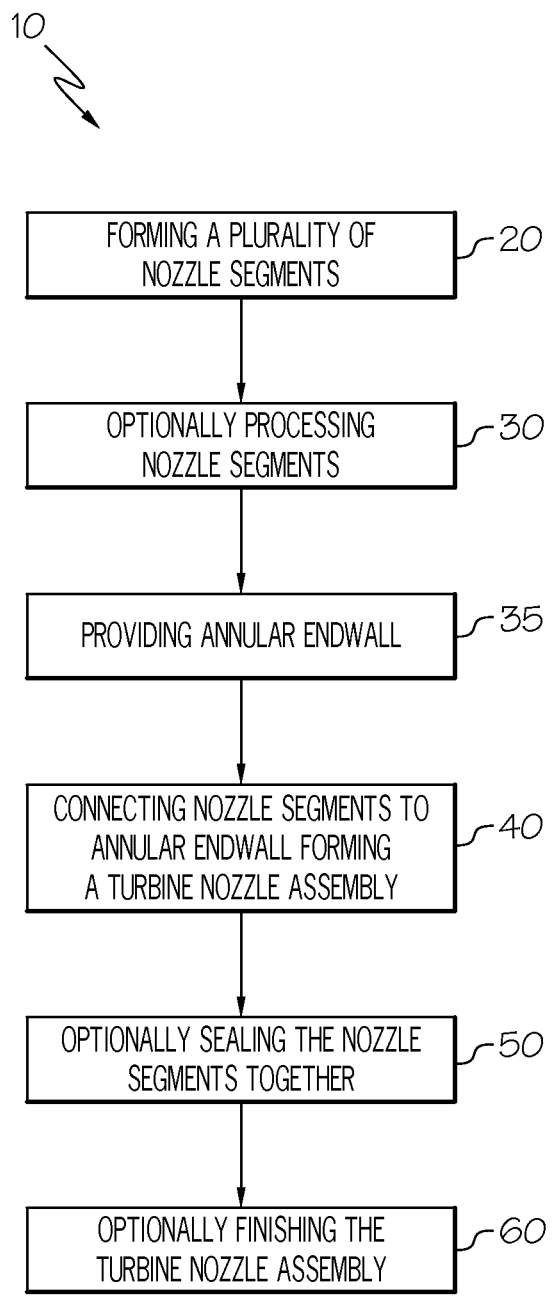
FIG. 3 is a flow diagram of a method for manufacturing a turbine nozzle with single crystal nozzle segments, according to exemplary embodiments of the present invention.
Figure 4:
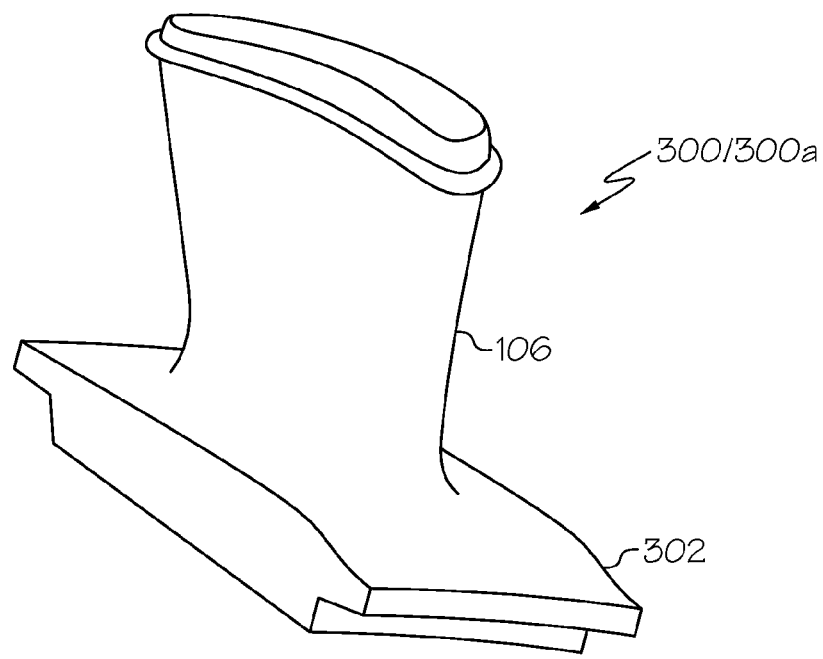
FIG. 4 is an isometric view of a cast single crystal nozzle segment (a singlet) of the turbine nozzle of FIG. 2, according to exemplary embodiments.
Figure 5:
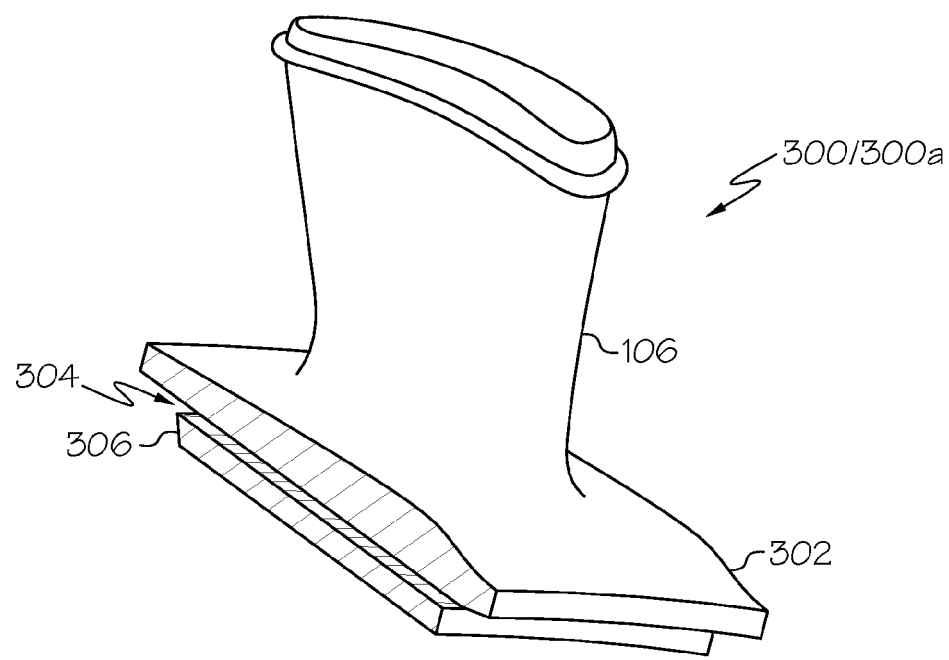
FIG. 5 is an isometric view of the cast single crystal nozzle segment of FIG. 4 including a feather-seal slot machined into opposing end faces thereof (only one of which is shown)
Figure 6:
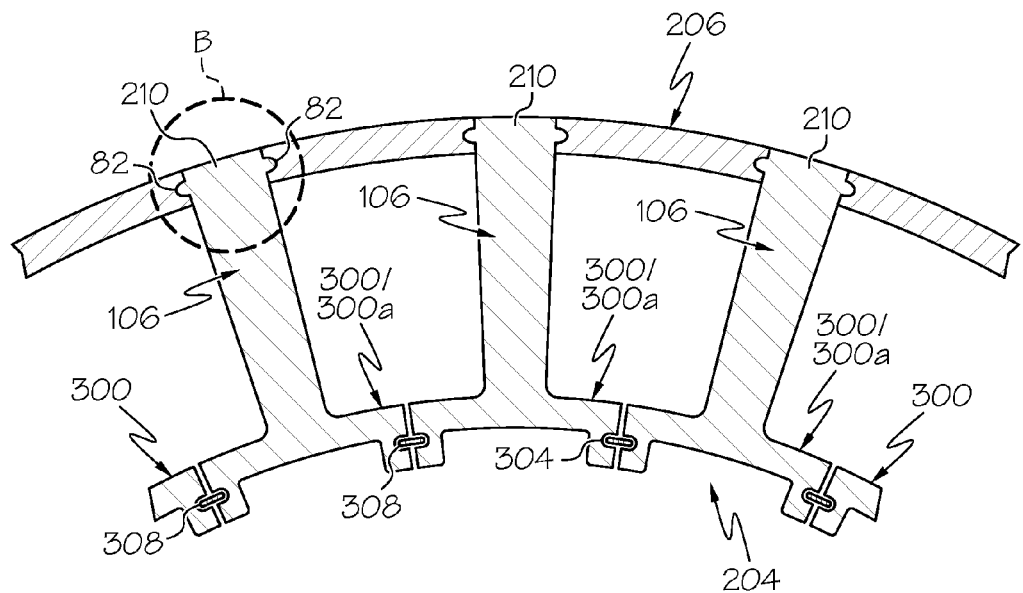
FIG. 6 is a cross-sectional side view of a portion of the turbine nozzle of FIG. 2 taken along line A-A thereof, depicting singlet nozzle segments bi-cast with the outer endwall ring as indicated by dotted circle B and the circumferentially adjacent nozzle segments sealed together by a feather seal received in intersecting feather-seal slots according to exemplary embodiments of the present invention.
Figure 7:
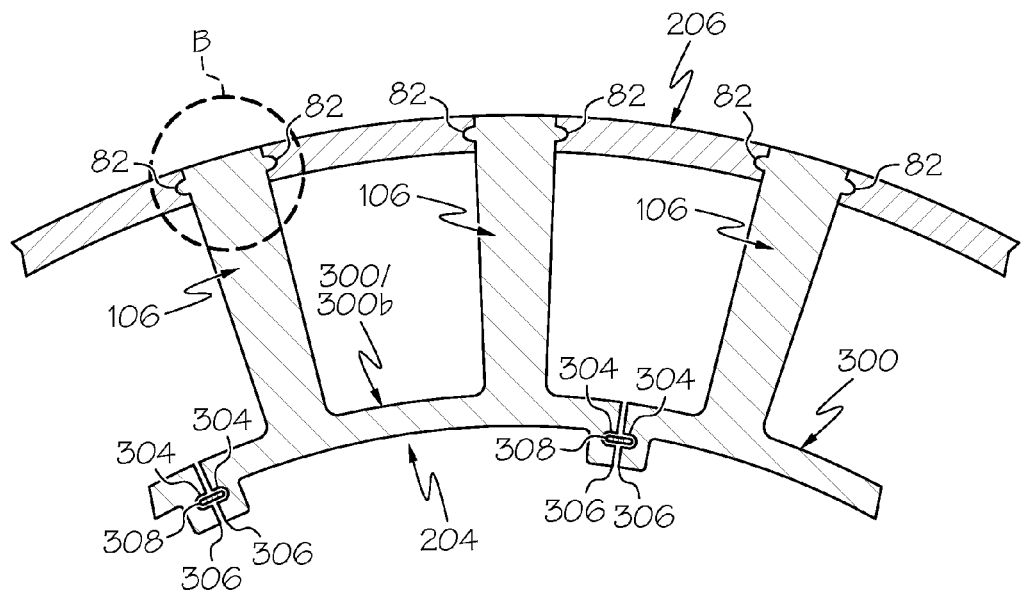
FIG. 7 is a cross-sectional side view similar to FIG. 6 of a portion of the turbine nozzle of FIG. 2, depicting a doublet nozzle segment circumferentially adjacent and between a pair of nozzle segments (partially shown)
Figure 8:
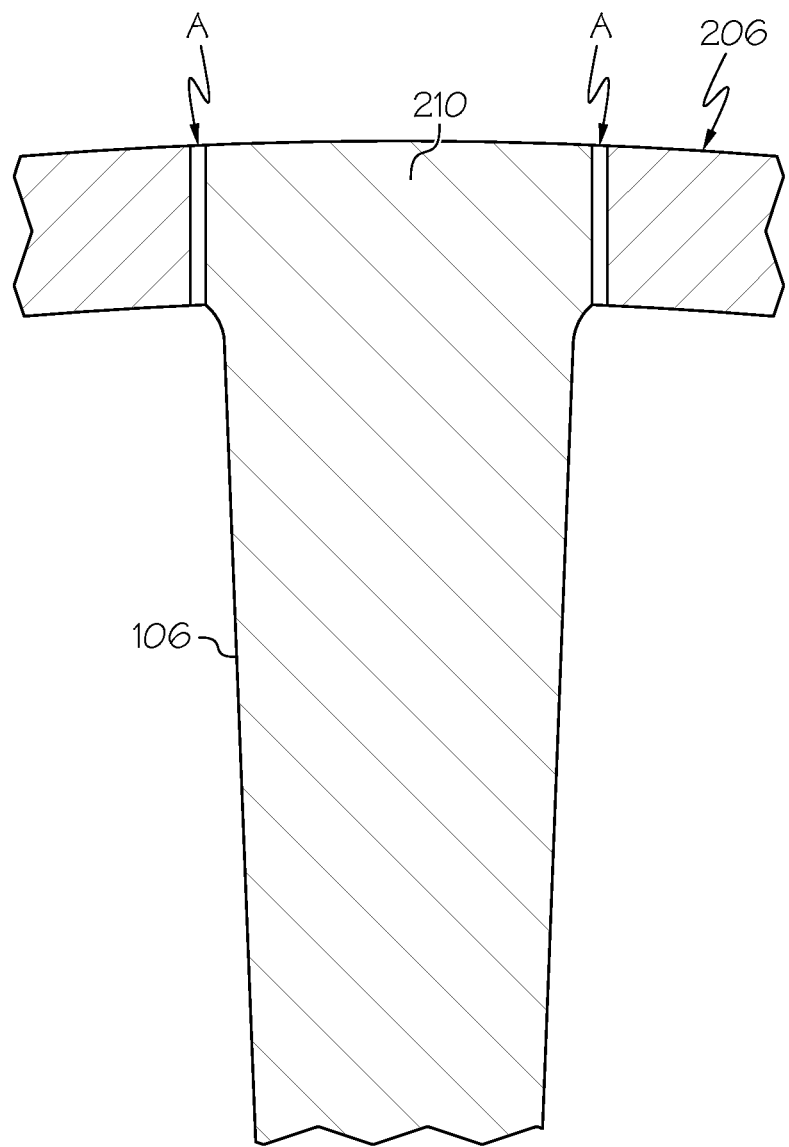
FIG. 8 is a cross-sectional view of a portion of a turbine nozzle similar to FIG. 2 taken along line A-A thereof, manufactured according to an alternative exemplary embodiment depicting a free end portion of a stationary vane of a nozzle segment (partially shown) brazed into the outer endwall ring of the turbine nozzle at braze joints A.

Referring now to FIG. 3, according to exemplary embodiments, a method 10 for manufacturing a turbine nozzle 104 such as depicted in FIGS. 1 and 2 begins by forming a plurality of nozzle segments 300 (step 20) (as exemplified by nozzle segments 300 depicted in FIGS. 4 through 7). The plurality of nozzle segments may be formed, for example, by casting. Each nozzle segment 300 comprises at least one vane 106 supported by a corresponding endwall ring portion 302. The endwall ring portions 302, when the nozzle segments 300 are assembled as hereinafter described, make up the segmented annular endwall. The endwall ring portions may also be referred to herein as "vane platforms." The nozzle segment 300 may be a singlet (single vane) 300a as best depicted in FIGS. 4, 5, and 6 or a multiplet such as a doublet (two vanes) 300b as depicted in FIG. 7, a triplet (three vanes) (not shown), or a quadruplet (four vanes) (not shown), etc. In general, singlets and doublets are preferred but nozzle segments with greater than two vanes may be used to form the segmented annular endwall. The coating advantages as hereinafter described decline with the number of vanes in each nozzle segment, however the leakage flows also decrease. While FIG. 6 depicts assembled singlet nozzle segments 300a, it is to be understood that the turbine nozzle may be manufactured with combinations of singlets, doublets, triplets, quadruplets, etc. In addition, while the nozzle segments depicted in FIGS. 4 through 8 include endwall ring portions of the inner endwall ring, it is to be understood that the nozzle segments may alternatively comprise endwall ring portions of the outer endwall ring and the at least one vane.

The nozzle segments 300 may be cast of a single crystal alloy. As used herein, a "single crystal alloy" is an alloy in which substantially the entire alloy has a single crystallographic orientation, without the presence of high angle grain boundaries. A small amount of low angle grain boundaries such as tilt, or twist boundaries are permitted within such a single crystal article but are preferably not present. However, such low angle boundaries are often present after solidification and formation of the single crystal article, or after some deformation of the article during creep or other light deformation process. Other minor irregularities are also permitted within the scope of the term "single crystal". For example, small areas of high angle grain boundaries may be formed in various portions of the article, due to the inability of the single crystal to grow perfectly near corners and the like. Such deviations from a perfect single crystal, which are found in normal commercial production operations, are within the scope of the term single crystal as used herein. The nozzle segments may be cast by methods well known in the art.

Referring again to FIG. 3, according to exemplary embodiments, method 10 continues by optionally processing one or more of the nozzle segments (step 30). In step 30, the nozzle segments may undergo processing including applying at least one protective coating, machining as hereinafter described, or combinations thereof. Such processing may be advantageously performed after forming the plurality of nozzle segments and prior to connecting the nozzle segments together as hereinafter described. Such processing may additionally or alternatively be used at other times.

The at least one protective coating may be, for example, a bond coating, a thermal barrier coating (TBC), an oxidation resistant coating, or the like. The ability to apply at least one protective coating to a nozzle segment, prior to connecting the nozzle segments improves the coating microstructure and thickness distribution because there are fewer or no adjacent vanes (no adjacent vanes in the case of a singlet nozzle segment) to cause surface shadowing. As noted previously, shadows cast by adjacent vanes place adjacent surfaces in the shadows and threaten the coating microstructure and thickness distribution.

The optional processing step 20 may alternatively or additionally comprise machining one or more of the nozzle segments to include features such as cooling holes (not shown), feather-seal slots 304 (FIG. 5), etc. Opposing end faces 306 of the endwall ring portions of the nozzle segments 300 may be machined to incorporate the feather-seal slots 304, as depicted in FIGS. 5, 6, and 7. The feather-seal slots 304 are configured to receive a feather seal 308 (FIGS. 6 and 7) in an optional sealing step (step 50) as hereinafter described. If the nozzle segments are not to be sealed together, no feather-seal slots are necessary. The forming (step 20) with or without optional processing (step 30) of the plurality of nozzle segments results in "prefabricated nozzle segments" or simply "nozzle segments."

Referring again to FIGS. 3 and 6 through 8, according to exemplary embodiments, the method 10 for manufacturing a turbine nozzle with single crystal nozzle segments continues by providing the one-piece annular endwall (step 35). In an embodiment, the step of providing the one-piece annular endwall comprises bi-casting the one-piece annular endwall. Bi-casting is well known in the art. The material for the annular endwall (the outer endwall ring 206 in FIGS. 6 and 7) is cast in a casting mold around the free end portion of the vanes of the prefabricated nozzle segments to both provide the annular endwall (step 35) and connect the annular endwall with the nozzle segments (step 40). Thus, for the bi-cast embodiment, steps 35 and 40 are performed simultaneously during bi-casting. The term "bi-casting" refers to the method in which the prefabricated nozzle segments are disposed in the casting mold. A "dog-bone feature" 82 (FIGS. 2 and 6 through 7) at the free end portion of the at least one vane of each nozzle segment fixedly attaches the vanes of the prefabricated nozzle segments to the bi-cast annular endwall. While bi-casting itself connects the nozzle segments with the annular endwall, the dog-bone feature 82 provides a mechanical bond with the prefabricated nozzle segment. FIGS. 6 and 7 depict the plurality of nozzle segments both connected and fixedly attached to the annular endwall formed by bi-casting, thereby forming a turbine nozzle assembly.

In an alternative embodiment, the step of providing the one-piece annular endwall (step 35) comprises separately casting the one-piece annular endwall. If the annular endwall is separately cast, the separately cast annular endwall is then connected to the plurality of nozzle segments in the connecting step 40 (thereby forming a turbine nozzle assembly) by brazing the free end portion of the vanes of the plurality of prefabricated nozzle segments to the annular endwall forming braze joints A (FIG. 8). The turbine nozzle manufactured according to the alternative embodiment appears similar to the turbine nozzle depicted in FIG. 2 except there is no "dog-bone feature" 82 as in FIGS. 2 and 6 through 7 at the free end portion of the vanes of the nozzle segments and access to the annular endwall is provided for applying a braze material to form the braze joints A.

Connecting the annular endwall to the plurality of nozzle segments in the connecting step 40 forms the turbine nozzle assembly comprising the segmented annular endwall concentric to the annular endwall with the at least one vane of each nozzle segment extending between the segmented annular endwall and the annular endwall. The single crystal nozzle segments of the turbine nozzle assembly are arranged in a circumferentially spaced relation. The endwall ring portions of circumferentially adjacent nozzle segments are butted end to end forming the segmented annular endwall. The prefabricated nozzle segments in the segmented annular endwall are discrete, without any direct connection to each other. As the segmented annular endwall comprises the endwall ring portions of the plurality of nozzle segments, substantially free radial movement is ensured by the discrete nozzle segments without the need of a slip joint at the interface of the vanes and one of the endwalls as in conventional bi-cast turbine nozzles. Manufacturing yields of turbine nozzles may also be increased because defective nozzle segments can be scrapped if found to be defective, rather than scrapping an entire turbine nozzle.

Suitable exemplary material for the annular endwall comprises an equi-axed alloy or other materials that do not have a single crystal orientation. For example, the one-piece annular endwall ring may be formed of metal or other materials that can withstand the extremely high operating temperatures (greater than about 2800° Fahrenheit) to which they are exposed in the gas turbine engine. The one-piece annular ring may be a unitary cast alloy structure produced by a precision casting operation utilizing various superalloy compositions. Various types of alloy, superalloy compositions and manufactures of such compositions are known to those skilled in the art.

Referring again to FIG. 3, according to exemplary embodiments, the method 10 for manufacturing the turbine nozzle with single crystal nozzle segments continues by optionally sealing the plurality of prefabricated nozzle segments together in the turbine nozzle assembly (step 50). The optional sealing step provides a direct connection between the prefabricated nozzle segments of the turbine nozzle assembly. A feather seal 308 fits into the intersecting featherseal slots 304 in each endwall ring portion (i.e., the vane platform) so as to seal the interface between abutting nozzle segments that make up the segmented annular endwall. The purpose of the feather seals is to seal off the fluid working medium from the ambient surrounding the fluid working medium and vice versa. For the bi-cast turbine nozzle assembly, the feather seals may be assembled prior to bi-casting as previously described, and thus trapped in-place by the slot geometry, or may be assembled after bi-casting and retained by a separate feather seal member.

To seal between the nozzle segments, the edge of the feather seal may be inserted into the feather-seal slot 304 of one of the prefabricated nozzle segments. The next adjacent nozzle segment is aligned so that its complementary featherseal slot 304 aligns with the opposite edge of the feather seal. The nozzle segments are urged toward each other so that they are in abutting end to end position. The adjacent nozzle segments 300 interlock to form a plurality of contiguous circumferentially adjacent nozzle segments as depicted in FIGS. 6 and 7. The dimensions (e.g., the widths and heights) and surface contours of the nozzle segments 300 are preferably substantially identical at the interlocking interface to provide a continuous or uninterrupted transition between nozzle segment surfaces to minimize leakage. As a result of this structural configuration, the turbine nozzle provides a substantially uninterrupted flowpath to minimize leakage of combustion gas. FIGS. 6 and 7 are cross-sectional side views depicting a portion of the turbine nozzle 104/turbine nozzle assembly (FIG. 2) after the sealing step 50. More specifically, FIG. 6 depicts a singlet nozzle segment 300a interlocking with other singlet nozzle segments 300a that are circumferentially adjacent. FIG. 7 depicts a doublet nozzle segment 300b interlocking with circumferentially adjacent nozzle segments 300 (partially shown).

Referring again to FIG. 3, in accordance with exemplary embodiments, method 10 for manufacturing a turbine nozzle with single crystal nozzle segments continues by optionally finishing the turbine nozzle assembly (step 60). Complete finish machining of the turbine nozzle assembly substantially ensures precise machining of critical sealing surfaces, thereby further reducing leakage flows, particularly between the turbine nozzle and mating structure that exists in conventional segmented turbine nozzles. The exemplary turbine nozzle illustrated partially in FIG. 2 is a turbine nozzle in which the critical sealing surfaces have been finished by machining or the like. In some exemplary embodiments, no such finishing treatments are necessary and step 60 may be omitted.

From the foregoing, it is to be appreciated that the methods for manufacturing turbine nozzles with single crystal alloy nozzle segments are provided. Such methods enable manufacturing a turbine nozzle with much lower technical risk relative to conventional bi-cast turbine nozzles as radial compliance is ensured without dependence on manufacture of a slip joint. Manufacture of turbine nozzles with single crystal alloy nozzle segments also permits turbine nozzles with less leakage flows and thus lower cooling flows than conventional segmented turbine nozzles.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for manufacturing a turbine nozzle comprising: forming a plurality of nozzle segments, each nozzle segment comprising an endwall ring portion with at least one vane, the at least one vane having a free end portion; connecting the free end portion of the at least one vane of each nozzle segment of the plurality of nozzle segments to an annular endwall, with the endwall ring portion of each nozzle segment of the plurality of nozzle segments forming a segmented annular endwall concentric to the annular endwall with the at least one vane of each nozzle segment extending between the segmented annular endwall and the annular endwall; machining a feather-seal slot in opposing ends of at least one nozzle segment of the plurality of nozzle segments for receiving an interlocking feather seal prior to the connecting step; and sealing the plurality of nozzle segments together during or after the connecting step, the step of sealing comprising inserting the interlocking feather seal into intersecting feather-seal slots between adjacent nozzle segments, wherein the step of connecting the free end portion of the at least one vane of each nozzle segment of the plurality of nozzle segments to the annular endwall comprises bi-casting the annular endwall around the free end portion of the at least one vane of each nozzle segment of the plurality of nozzle segments.

2. The method of claim 1, wherein the step of forming a plurality of nozzle segments comprises forming the plurality of nozzle segments with a single crystal material.

3. The method of claim 1, wherein the step of forming a plurality of nozzle segments comprises forming by casting.

4. The method of claim 1, wherein the step of forming a plurality of nozzle segments comprises forming a plurality of singlet nozzle segments, doublet nozzle segments, triplet nozzle segments, quadruplet nozzle segments, or combinations thereof.

5. The method of claim 1, further comprising the step of processing at least one nozzle segment of the plurality of nozzle segments prior to the connecting step, wherein the step of processing comprises applying a protective coating to at least one nozzle segment of the plurality of nozzle segments, the annular endwall, or both.

6. The method of claim 1, further comprising machining at least one cooling hole in at least one nozzle segment prior to the step of connecting.

7. The method of claim 1, wherein the step of connecting the plurality of nozzle segments comprises circumferentially spacing the plurality of nozzle segments along the annular endwall with the endwall ring portion of each nozzle segment cooperating to form the segmented annular endwall.

8. A method for manufacturing a turbine nozzle comprising:
   forming a plurality of nozzle segments configured to be connected to an outer annular endwall, each nozzle segment integrally cast as one piece from a single crystal alloy material and comprised of an inner endwall ring portion and at least one vane having a free end portion;
   bi-casting the outer annular endwall around the plurality of nozzle segments, the inner endwall ring portion of each nozzle segment cooperating with a circumferentially adjacent nozzle segment to form a segmented inner annular endwall, with the at least one vane of each nozzle segment extending between the segmented inner annular endwall and the outer annular endwall;
   machining a feather-seal slot in opposing ends of at least one nozzle segment for receiving a portion of an interlocking feather seal prior to bi-casting; and
   sealing the plurality of nozzle segments together during or after bi-casting, the step of sealing comprising inserting the portion of the feather seal into intersecting feather-seal slots between adjacent nozzle segments.

9. The method of claim 8, wherein the segmented inner annular endwall is disposed concentric to and radially from the outer annular endwall.

10. The method of claim 8, wherein the step of forming a plurality of nozzle segments comprises forming a plurality of doublet nozzle segments.

11. The method of claim 8, further comprising the step of processing at least one nozzle segment of the plurality of nozzle segments prior to bi-casting, wherein the step of processing comprises applying a protective coating to at least one nozzle segment of the plurality of nozzle segments, the outer annular endwall, or both.

12. The method of claim 8, further comprising machining at least one cooling hole in at least one nozzle segment prior to the bi-casting.

13. The method of claim 8, wherein bi-casting the outer annular endwall around the plurality of nozzle segments comprises bi-casting the outer annular endwall around the free end portion of the at least one vane of each nozzle segment of the plurality of nozzle segments.

* * * * *